United States Patent
Chung et al.

(10) Patent No.: US 12,282,805 B2
(45) Date of Patent: Apr. 22, 2025

(54) APPARATUS AND METHOD FOR MANAGING TRUST-BASED DELEGATION CONSENSUS OF BLOCKCHAIN NETWORK USING DEEP REINFORCEMENT LEARNING

(71) Applicant: INDUSTRY-ACADEMIC COOPERATION FOUNDATION, YONSEI UNIVERSITY, Seoul (KR)

(72) Inventors: Jong-Moon Chung, Seoul (KR); Yun Yeong Goh, Incheon (KR); Ju Sik Yun, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 267 days.

(21) Appl. No.: 18/048,125

(22) Filed: Oct. 20, 2022

(65) Prior Publication Data

US 2023/0139892 A1    May 4, 2023

(30) Foreign Application Priority Data

Oct. 27, 2021    (KR) .................. 10-2021-0144312

(51) Int. Cl.
*H04L 67/10*   (2022.01)
*G06F 9/50*    (2006.01)

(52) U.S. Cl.
CPC ............ *G06F 9/5072* (2013.01); *H04L 67/10* (2013.01)

(58) Field of Classification Search
CPC .............................. G06F 9/5072; H04L 67/10
See application file for complete search history.

(56) References Cited

U.S. PATENT DOCUMENTS

| | | | |
|---|---|---|---|
| 2019/0297101 A1* | 9/2019 | Dhakshinamoorthy | G06F 21/6218 |
| 2020/0027089 A1* | 1/2020 | Kuchar | G06F 16/1837 |
| 2020/0403776 A1* | 12/2020 | Oh | H04L 9/3247 |
| 2023/0092547 A1* | 3/2023 | Signorini | H04L 9/50 713/168 |

FOREIGN PATENT DOCUMENTS

KR    10-2020-0106604 A    9/2020

OTHER PUBLICATIONS

Collaborative Trust Blockchain Based Unbiased Control Transfer Mechanism for Industrial Automation (Year: 2020).*
On Performance of PBFT Blockchain Consensus Algorithm for IoT-Applications With Constrained Devices (Year: 2021).*

* cited by examiner

*Primary Examiner* — Suraj M Joshi (57) ABSTRACT

An apparatus for managing delegation consensus of a blockchain network, obtains state information including trust of each delegated node in the current epoch of the blockchain network, determines an action including a delegation rate by performing a neural network operation on the state information, creates, according to the determined action, a local trust opinion (hereinafter, LTO) matrix representing a mutual subjective evaluation of each delegated node, and selects, based on the trust calculated using the LTO matrix, K delegated nodes according to the determined delegation rate among N nodes.

18 Claims, 6 Drawing Sheets

APPARATUS AND METHOD FOR MANAGING TRUST-BASED DELEGATION CONSENSUS OF BLOCKCHAIN NETWORK USING DEEP REINFORCEMENT LEARNING

CROSS-REFERENCE TO RELATED APPLICATIONS

This application claims priority under 35 U.S.C. § 119(a) to Korean Patent Application No. 10-2021-0144312, filed on Oct. 27, 2021, in the Korean Intellectual Property Office, the disclosure of which is incorporated herein in its entirety by reference.

BACKGROUND

1. Technical Field

The present disclosure relates to an apparatus and method for managing a blockchain network, more particularly to an apparatus and method for managing trust-based delegation consensus of a blockchain network.

2. Description of the Related Art

Blockchain provides transparency and security to data management systems and can be used in a variety of industries (e.g. energy trading, smart factories, resource management). However, when combining blockchain with Industrial Internet of Things (IIoT) networks that generate massive real-time data based on various applications, the database storage blockchain system must meet stringent quality of service (QoS) requirements. In particular, in a blockchain enabled real-time IIoT network, the problem of low throughput arising from the consensus process must be addressed.

Bitcoin and Ethereum, which are representative blockchain systems, are set to support 3 to 4 and 14 Transactions Per Second (hereinafter, TPS), which are significantly slower than the IIoT network's data generation speed and credit card throughput. In order to solve such a low TPS problem, a more advanced scalable blockchain technology was required. In response to this demand, various blockchains that improve scalability have been proposed. However, existing scalability enhancement techniques have a problem in that the influence of malicious nodes may increase and thus security may decrease.

In other words, according to a blockchain trilemma, there is a limitation in the blockchain system that it cannot improve all three characteristics (decentralization, security, scalability) of the blockchain. Therefore, there is a demand for a method to improve the scalability of the blockchain by improving the TPS while maintaining or improving security.

SUMMARY

An object of the present disclosure is to provide an apparatus and method for managing trust-based delegation consensus of a blockchain network, capable of improving scalability of a blockchain by improving TPS while maintaining or improving security.

Another object of the present disclosure is to provide an apparatus and method for managing delegation consensus of a blockchain network that can satisfy decentralization constraints while selecting a ratio of nodes to be delegated and nodes to be delegated based on trust.

An apparatus for managing delegation consensus of a blockchain network, according to the present embodiment, conceived to achieve the objectives above, obtains state information including trust of each delegated node in the current epoch of the blockchain network, determines an action including a delegation rate by performing a neural network operation on the state information, creates, according to the determined action, a local trust opinion (hereinafter, LTO) matrix representing a mutual subjective evaluation of each delegated node, and selects, based on the trust calculated using the LTO matrix, K delegated nodes according to the determined delegation rate among N nodes.

The apparatus for managing delegation consensus of a blockchain network may create the LTO matrix by collecting Delegated Consensus Result (hereinafter, DCR) records in which each delegated node selected in the current epoch collects commit messages for consent or non-consent propagated from other nodes during the Practical Byzantine Fault Tolerance (hereinafter, PBFT) consensus process.

In the apparatus for managing delegation consensus of a blockchain network, the processor may calculate the trust of the delegated node by calculating an average subjective trust value and trust similarity for each delegated node based on the LTO matrix.

In addition to the trust of each delegated node, the apparatus for managing delegation consensus of a blockchain network may further obtain a data transmission rate between delegated nodes and computational resources of each delegated node, the number of times delegated nodes participated in delegation consensus, and malicious delegated node probability representing a probability that a malicious node whose calculated trust is less than or equal to a predetermined trust threshold is selected as a delegated node, as the state information.

The apparatus for managing delegation consensus of a blockchain network may calculate a latency representing a time from when a transaction is applied to the blockchain network to an irreversible state through a consensus process, determine a latency condition according to u consecutive block intervals, determine a safety condition indicating a range of delegation rate that makes a ratio of malicious nodes among delegated nodes participating in the consensus according to a PBFT condition less than a predetermined ratio, calculate a Gini coefficient representing a degree of imbalance in the number of times selected as a delegated node among N nodes, determine a Gini coefficient condition that ensures that the Gini coefficient does not exceed a predetermined decentralization threshold, and, when the determined action satisfies the latency condition, the safety condition and the Gini coefficient condition, calculate a reward.

In the apparatus for managing delegation consensus of a blockchain network, the processor may determine the action ($A^t$) by determining a block size (B), a block interval ($T_I$) and a delegation rate ($\varphi$) maximizing TPS (Transaction Per Second) while satisfying the latency condition, the safety condition, and the Gini coefficient condition.

A method for managing delegation consensus of a blockchain network, according to an embodiment, conceived to achieve the objectives above, comprises the steps of: obtaining state information including trust of each delegated node in the current epoch of the blockchain network; determining an action including a delegation rate by performing a neural network operation on the state information; creating, according to the determined action, a local trust opinion (hereinafter, LTO) matrix representing a mutual subjective evaluation of each delegated node; and selecting, based on the trust calculated using the LTO matrix, K delegated nodes according to the determined delegation rate among N nodes.

Accordingly, the apparatus and method for managing delegation consensus of a blockchain network according to an embodiment of the present disclosure can maintain or improve security while improving TPS by selecting a ratio of nodes to be delegated and nodes to be delegated based on trust, and control that the same node is not excessively selected as a delegated node, so that decentralization constraints can be satisfied.

Accordingly, blockchain can be used stably even in an environment where large-scale transactions are generated and processed within a limited service time, such as in an IIoT network.

DETAILED DESCRIPTION

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 1:
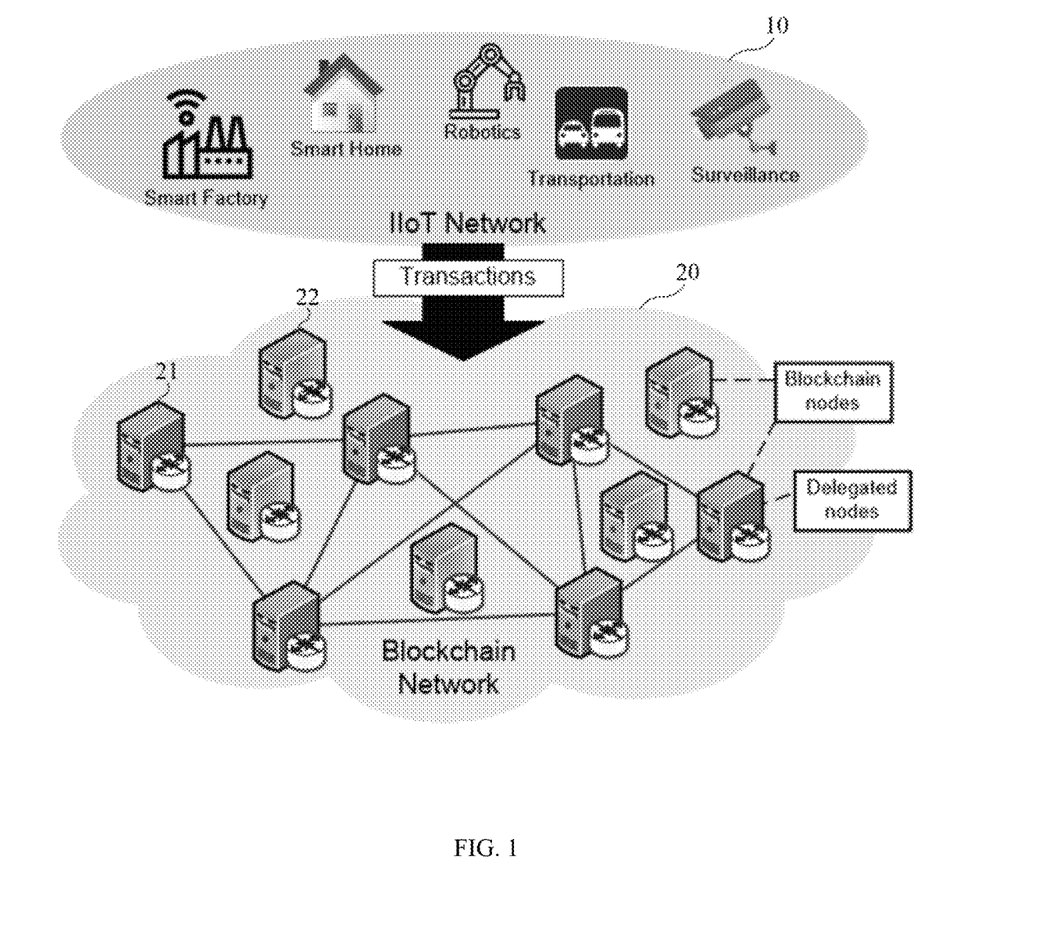
FIG. 1 shows a schematic structure of a delegation consensus-based blockchain network in an IIoT network environment.

FIG. 1 shows a schematic structure of a delegation consensus-based blockchain network in an IIoT network environment.

Referring to FIG. 1, in the IIoT network 10 where various IIoT devices such as smart factory, smart home, robotics, transportation and surveillance devices are deployed, each device performs a designated operation and communicates with each other to create various transactions such as data storage and data sharing. And the created large amount of transactions are transmitted to the blockchain network 20.

The blockchain network 20 receives transactions from the IIoT network 10 and records them in blocks serving as a distributed ledger for reliable data management. As described above, in the existing blockchain network, all nodes of the blockchain network, called miners or validators, participate in the consensus process to verify the transmitted transaction. In this case, a large amount of transactions are applied from the IIoT network 10, and as a large number of nodes participate in the consensus process, the time to reach a consensus becomes long, so the transaction cannot be processed within the required service time.

Accordingly, the delegation consensus blockchain network 20 of the present embodiment allows only some nodes, not all nodes, to participate in the consensus process as delegated nodes 21 for transactions applied from the IIoT network 10, thereby significantly improving Transactions Per Second (hereinafter, TPS).

In the present embodiment, the apparatus for managing a network manages such that the TPS of the delegation consensus blockchain network 20 can be improved depending on the state of the delegation consensus blockchain network 20, and that even when the TPS improves, the security of the blockchain network can be maintained or further improved. In other words, by optimizing the blockchain network, the scalability of the blockchain network can be improved. In particular, the apparatus for managing a network according to the present embodiment may be trained by Deep Reinforcement Learning (hereinafter, DRL), so that it can adaptively optimize and manage the blockchain network depending on the state of the blockchain network.

Here, it is assumed that the delegation consensus blockchain network 20 includes N (N is a natural number) nodes. And among the N nodes, K nodes (where $K = \lfloor \varphi N \rfloor$ and $\lfloor \cdot \rfloor$ is the maximum integer function) according to the delegation rate ($\varphi$, where $0 < \varphi \leq 1$) participate in the consensus process as the delegated nodes 21. K delegated nodes 21 become elements of a delegated node set ($N_D$, where $N_D \subset N$). Here, the delegation rate ($\varphi$) and the nodes selected as the delegated node 21 among a plurality of nodes are determined by the apparatus for managing a network according to deep reinforcement learning, a detailed description thereof will be described later.

In the present embodiment, the delegation consensus blockchain network 20 uses a Practical Byzantine Fault Tolerance (hereinafter, PBFT) consensus algorithm as a consensus algorithm. The PBFT consensus algorithm is suitable for application to the scalable IIOT network 10 because it uses low computational resources and has a fast consensus speed.

In the above, the IIoT network 10 and the blockchain network 20 are separated for convenience of description, but a plurality of IIoT devices in the IIoT network 10 can operate as nodes of the blockchain network 20. In addition, the apparatus for managing a network may be implemented by being included in at least one node among a plurality of nodes.

Figure 2:
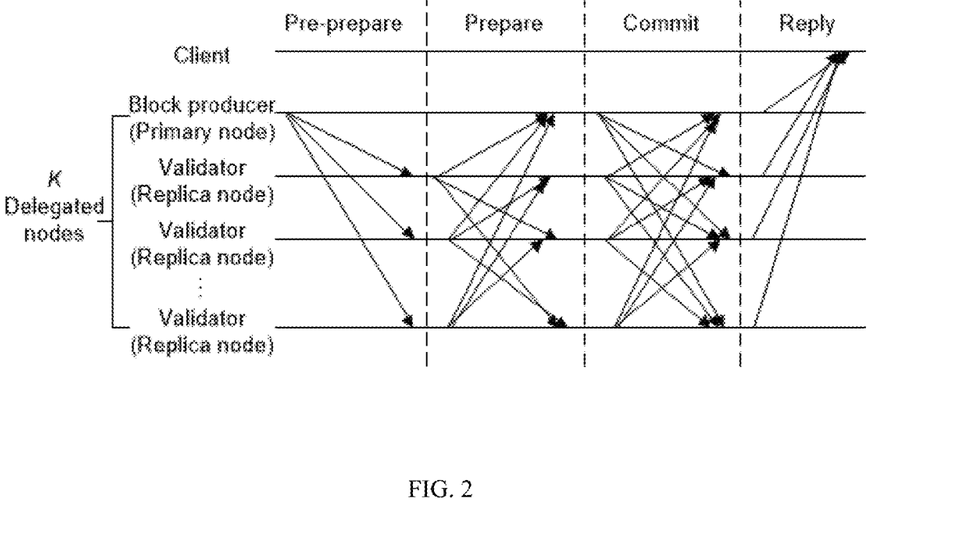
FIG. 2 shows an example of a consensus process through a PBFT consensus algorithm.

FIG. 2 shows an example of a consensus process through a PBFT consensus algorithm.

Referring to FIG. 2, the PBFT consensus algorithm may consist of pre-prepare, prepare, commit, and reply steps.

In FIG. 2, an algorithm is shown in which K delegated nodes 21 selected from a delegation consensus blockchain network 20 including N nodes as an example perform a consensus process. One of the K delegated nodes 21 is a primary node, which is a block producer that creates a block according to a transaction request, and the other nodes are replica nodes, which are validators that validate consensus on blocks created by the block producer. For the block producer, one delegated node may be randomly selected among the K delegated nodes.

In the PBFT consensus algorithm, the block producer collects transactions generated in the IIOT network and creates blocks according to blockchain parameters.

The block producer creates M-sized blocks according to M requests of a pre-specified batch size. In the pre-prepare step, the block producer transmits the created blocks to the validators and requests validation. In this case, the block producer creates Message Authentication Codes (hereinafter, MAC) corresponding to K−1 validators, transmits them to the validators, and requests validation.

In the prepare step, when a block is transmitted from the block producer, each of the validators performs an operation on the MAC and propagates a confirmation message to other validators. In the subsequent commit step, each of the validators verifies the validity of the transmitted block and propagates a commit message. Here, a valid block means a block whose header contents and transaction list are not falsified and whose hash value is not modified. Each of the validators transmits an intention message for consent ("Yea") or non-consent ("Nay") to other validators as a result of verifying block creation in the commit step. In the reply step, when each of the plurality of validators receives a commit message for consent ("Yea") from more than ⅔ of all validators including itself, the each of the plurality of validators determines that the corresponding block is a valid block, connects it to a chain of produced blocks, and replies the blockchain consensus result to the block producer. In addition, all nodes of the delegation consensus blockchain network 20 can confirm the result of the delegation consensus.

As described above, in the present embodiment, K delegated nodes 21 among N nodes perform the consensus process according to the PBFT consensus algorithm.

Hereinafter, the configuration of a plurality of nodes of the delegation consensus blockchain network 20 will be described.

Figure 3:
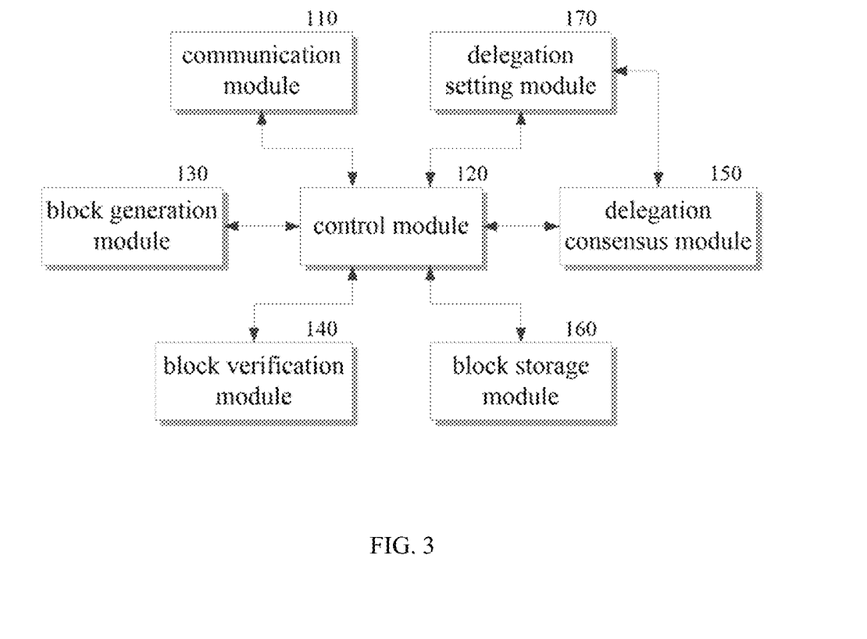
FIG. 3 shows a schematic structure of a plurality of nodes in a delegation consensus blockchain network according to an embodiment of the present disclosure.

FIG. 3 shows a schematic structure of a plurality of nodes in a delegation consensus blockchain network according to an embodiment of the present disclosure.

Referring to FIG. 3, each of a plurality of nodes of the blockchain network 20 may include a communication module 110, a control module 120, a block generation module 130, a block verification module 140, a delegation consensus module 150, and a block storage module 160.

The communication module 110 enables the apparatus for managing a network to communicate with other nodes on the delegation consensus blockchain network 20. In addition, the control module 120 controls each component of the node to transmit data between respective components inside, and controls the communication module 110 to transmit/receive data with other nodes.

When a corresponding node is selected as a block producer, the block generation module 130 collects transactions to be processed from the IIOT network 10 and creates a block. Here, as described above, the block producer may be randomly selected by the apparatus for managing a blockchain network. Then, the generated block is propagated to validators, which are other delegated nodes of the blockchain network, through the communication module 110. As shown in FIG. 2, when more than ⅔ consent is obtained through TD-PBFT (Trust based Delegated PBFT) consensus process by a plurality of delegated nodes of the delegation consensus blockchain network 20, the generated block is declared as a final block and linked to the previously stored blockchain on each node.

When a block is created and propagated from the delegated node selected as the block producer, the block verification module 140 transmits a confirmation message to other delegated nodes of the blockchain network through the communication module 110. Then, it verifies the validity of the transmitted block, generates a commit message for consent ("Yea") or non-consent ("Nay") as a result of verifying, and propagates the generated commit message to other validators.

The delegation consensus module 150 derives a Delegated Consensus Result (DCR) by collecting its own commit message as a verification result and commit messages propagated from other validators. Here, as shown in (a) of FIG. 6, the collected commit messages may be referred to as a DCR record. The delegation consensus module 150 obtains a DCR record by collecting its own commit message and commit messages propagated from other validators, and when more than ⅔ validators in the obtained DCR record transmit a commit message for consent ("Yea"), determines that a block generated as a result of the delegation consensus is a valid block.

The block storage module 160 receives and stores the block determined to be valid in the delegation consensus module 150. Here, the block storage module 160 connects and stores the received block to the previously stored blockchain. And it can propagate the stored blockchain to other nodes of the blockchain network.

Meanwhile, in the delegation consensus blockchain network 20 of the present embodiment, an apparatus for managing a network for improving the TPS of the blockchain network may be further included. The apparatus for managing a network sets a delegation rate ($\varphi$), which is a ratio of delegated nodes among a plurality of nodes, to improve scalability by maximizing TPS while satisfying security and decentralization among the trilemma of the blockchain network, and selects delegated nodes 21 according to the set delegation rate ($\varphi$).

Figure 4:
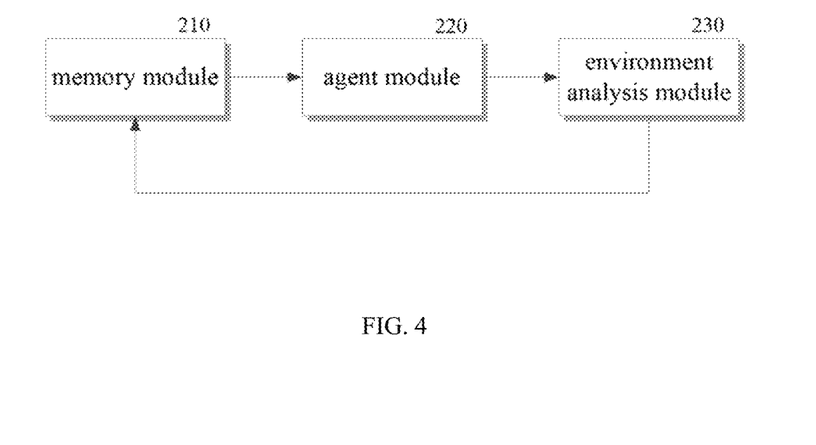
FIG. 4 shows a schematic structure of an apparatus for managing a network according to an embodiment of the present disclosure.
Figure 5:
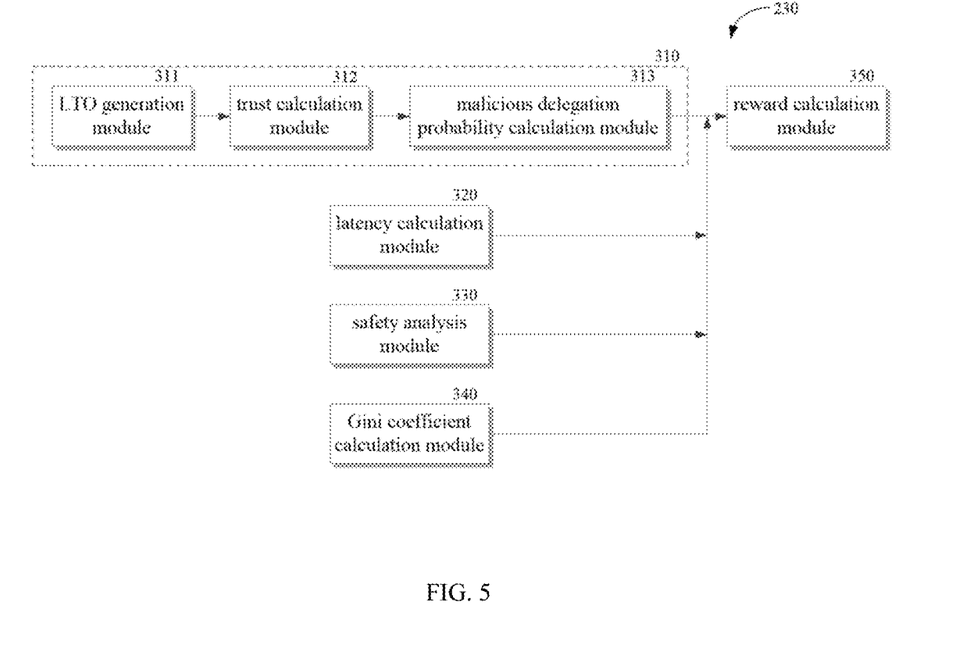
FIG. 5 shows an example of a detailed configuration of the environment analysis module of FIG. 4.
Figure 6:
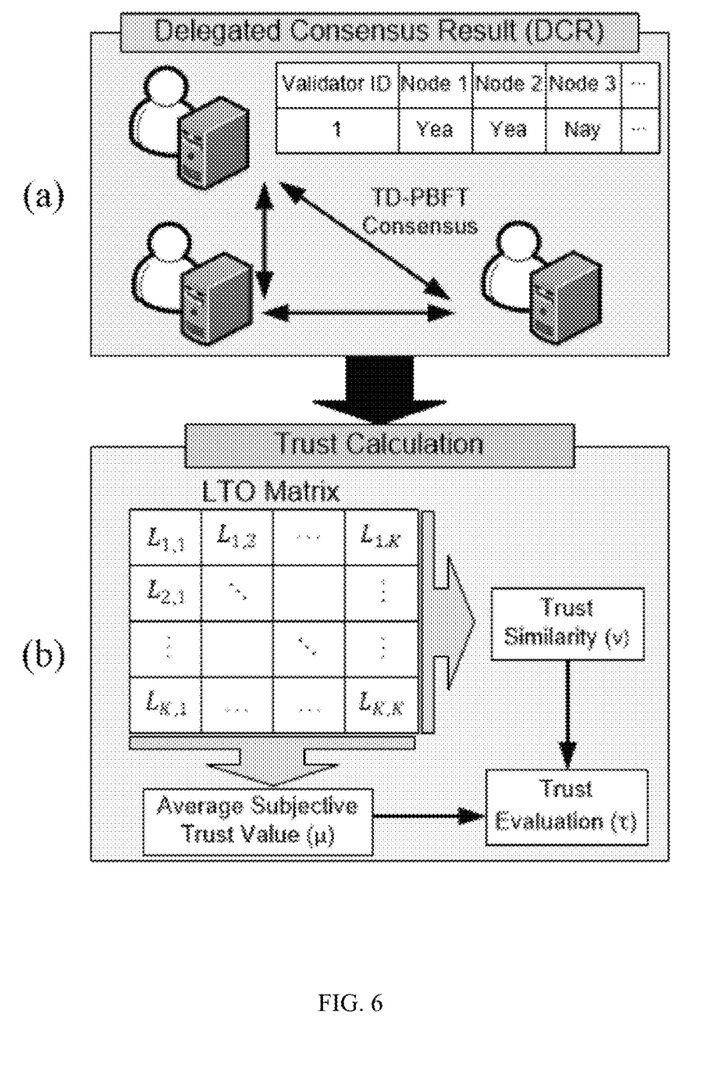
FIG. 6 is a diagram for explaining how the trust calculation module of FIG. 5 calculates a trust based on a delegation consensus result.

FIG. 4 shows a schematic structure of an apparatus for managing a network according to an embodiment of the present disclosure, FIG. 5 shows an example of a detailed configuration of the environment analysis module of FIG. 4, and FIG. 6 is a diagram for explaining how the trust calculation module of FIG. 5 calculates a trust based on a delegation consensus result.

The apparatus for managing a network may be configured as a separate and independent apparatus from a plurality of nodes of the delegation consensus blockchain network 20, but at least one node among a plurality of nodes may also function as an apparatus for managing a network. In addition, when a node of the delegation consensus blockchain network 20 operates as an apparatus for managing a network, the corresponding node may further include a delegation setting module 170, as shown in FIG. 3.

In the present embodiment, the apparatus for managing a network (or delegation setting module 170) may be implemented by including an artificial neural network that is pre-trained in a deep reinforcement learning (DRL) method. For example, in the present embodiment, the apparatus for managing a network may be configured based on a rainbow DQN (Rainbow Deep Q Network) trained by a DRL method among artificial neural networks.

Referring to FIG. 4, the apparatus for managing a network (or delegation setting module 170) may include a memory module 210, an agent module 220 and an environment analysis module 230.

The memory module 210 matches and stores the state information ($S^t$) corresponding to each epoch (t) and the action ($A^t$) corresponding to the state information ($S^t$) as an environment of the trust-based delegation consensus blockchain network 20. The agent module 220 determines an action ($A^t$) according to the state information ($S^t$). The environment analysis module 230 calculates a next state information ($S^{t+1}$) and a reward ($R^t$) corresponding to the next state information ($S^{t+1}$) based on the state information ($S^t$) and the action ($A^t$) determined according to the state information ($S^t$).

First, the environment analysis module 230 may include a trust evaluation module 310, a latency calculation module 320, a safety analysis module 330, a Gini coefficient calculation module 340 and a reward calculation module 350, as shown in FIG. 5, to calculate the next state information ($S^{t+1}$) and the reward ($R^t$).

Here, the trust evaluation module 310 calculates trust for each of a plurality of nodes, and the latency calculation module 320, a safety analysis module 330 and a Gini coefficient calculation module 340 calculate latency, safety, and Gini coefficient in order to consider scalability, security, and decentralization, which are the trilemma of blockchain networks, respectively. In addition, the reward calculation module 350 calculates the reward ($R^t$) according to whether or not the next state information ($S^{t+1}$) satisfies the condition for latency, safety and Gini coefficient, respectively, based on the determined action ($A^t$).

The trust evaluation module 310 collects DCR records derived from a plurality of delegated nodes, creates a Local Trust Opinion (hereinafter, LTO) matrix representing a mutual subjective evaluation of the plurality of delegated nodes based on the collected DCR records, and evaluates the trust for each of a plurality of nodes based on the created LTO matrix.

The trust evaluation module 310 may include an LTO generation module 311, a trust calculation module 312, and a malicious delegation probability calculation module 313.

The LTO generation module 311 generates an LTO matrix by collecting DCR records obtained from a plurality of delegated nodes. In the LTO matrix, each row represents a delegated node that generated a DCR record as a delegated node performing subjective evaluation on delegated nodes, and each column represents a delegated node that transmitted a commit message included in the DCR record as a delegated node being evaluated. That is, in the LTO matrix, each element ($L_{i,j}$) represents the subjective trust of a delegated node (i) for a delegated node (j). Here, i and j are delegated node identifiers, respectively, and are (i, j∈[1, 2, . . . , K]) as location coordinates of the LTO matrix. Each element ($L_{i,j}$) of the LTO matrix can be calculated according to Equation 1.

$$L_{i,j} = \begin{cases} \dfrac{\sum_i (\text{Yea})}{\sum_i (\text{Yea}) + \sum_i (\text{Nay})}, & \text{if commit of } j \text{ is 'Yea'} \\ \dfrac{\sum_i (\text{Nay})}{\sum_i (\text{Yea}) + \sum_i (\text{Nay})}, & \text{if commit of } j \text{ is 'Nay'} \end{cases} \quad [\text{Equation 1}]$$

Here, $\Sigma_i(\text{Yea})$ and $\Sigma_i(\text{Nay})$ are the number of consent ("Yea") and non-consent ("Nay") in the DCR of delegated node (i), respectively. For example, when a delegated node (i) receives a commit message of consent ("Yea") from a delegation node (j), and the ratio of consent ("Yea") in the DCR of the delegated node (i) is 75%, the element ($L_{i,j}$) of the LTO matrix is calculated as 0.75.

When the LTO matrix is generated, the trust calculation module 312 calculates the trust for each of the plurality of delegated nodes based on the generated LTO matrix. At this time, the delegation setting module 170 may calculate an average subjective trust value (μ) and trust similarity (v) for each delegated node from the LTO matrix.

Here, the average subjective trust value means an average value of subjective trust evaluated by a plurality of delegated nodes for a specific delegated node (i), and the trust similarity (v) represents a degree of similarity between subjective evaluations evaluated by each delegated node for a plurality of delegated nodes.

The trust calculation module 312 may calculate the average subjective trust value ($μ_i$) for a delegated node (i) according to Equation 2.

$$\mu_i = \frac{1}{K}\sum_{j=1}^{K} L_{j,i} \quad [\text{Equation 2}]$$

(wherein, $L_{j,i}$ represents (j, i) element of the LTO matrix.)

The average subjective trust value ($μ_i$) according to Equation 2 indicates that the delegated node (i) submitted the correct commit message at the time of block verification. If a valid block is created, a normal delegated node transmits a commit message of consent ("Yea"). However, a malicious delegated node transmits a commit message of non-consent ("Nay"). In this way, when a malicious delegated node transmits a commit message of non-consent ("Nay"), since the ratio of non-consent ("Nay") is smaller than consent ("Yea"), the average subjective trust value ($μ_i$) for the malicious node is lowered.

Meanwhile, the trust similarity ($v_i$) for a delegated node (i) may be calculated as an average of cosine similarities of row vectors in the LTO matrix as shown in Equation 3.

$$v_i = \frac{1}{K}\sum_{j=1}^{K} \frac{L_i \cdot L_j}{\|L_i\|\|L_j\|} \quad [\text{Equation 3}]$$

Here, $\|\cdot\|$ is an absolute value function, and $L_i$ and $L_j$ represent the i-th and j-th row vectors of the LTO matrix, respectively. The trust similarity (v) can be used to impose a penalty on delegated nodes 21 which falsify the DCR record. When a malicious node creates a DCR record by falsifying a commit message and lowers the trust level of a normal node, the trust similarity (vi) of Equation 3 is lowered.

Furthermore, the trust calculation module 312 calculates the trust ($\tau$) of each delegated node from the average subjective trust value ($\mu_i$) and trust similarity ($v_i$) calculated according to Equations 2 and 3, as in Equation 4.

$$\tau_i = \mu_i v_i \qquad \text{[Equation 4]}$$

That is, the trust calculation module 312 uses the LTO matrix to lower the average subjective trust value ($\mu$) when a malicious delegated node falsifies a commit message that is a result of validating against a block, to lower the trust similarity ($v$) when falsifying the DCR record obtained by collecting commit messages, so that the trust ($\tau$) for the malicious delegated node is lowered, and to increase the trust ($\tau$) in the case of a normal delegated node transmitting a normal commit message and DCR record.

In the present embodiment, the apparatus for managing a network (or delegation setting module 170) may select a delegated node with different probabilities according to the trust ($\tau$) of each of a plurality of nodes. That is, by increasing the probability that a node with high trust ($\tau$) is selected as a delegated node, and by decreasing the probability that a node with low trust ($\tau$) is selected as a delegated node, it can reduce the possibility of a malicious node being selected as a delegated node.

Here, an initial trust ($\tau$) of a plurality of nodes may be set to 0.5 ($\tau$=0.5). Meanwhile, the malicious delegation probability calculation module 313 may estimate a probability that a malicious node is included in the delegated node set ($N_D$). Here, a node whose trust ($\tau$) is less than or equal to a predetermined trust threshold ($\psi$) is referred to as a malicious node. Since it is assumed that the initial trust ($\tau$) of each node is set to 0.5, and as described above, when calculating a trust, a trust ($\tau$) of a normal node increases, while a trust ($\tau$) of a malicious node decreases, a node whose trust ($\tau$) is less than 0.5 may be referred to as a malicious node.

Furthermore, a malicious node delegation probability ($\widehat{p}_d$) that a malicious node is included in the delegated node set ($N_D$) can be calculated as shown in Equation 5.

$$\widehat{p}_d = \frac{n(i \mid i \in N_D, \tau_i \leq \psi)}{K} \qquad \text{[Equation 5]}$$

Here, $n(\cdot)$ is a count function that counts the number satisfying the condition of ($\cdot$).

That is, the malicious node delegation probability ($\widehat{p}_d$) represents the ratio of the number of nodes whose trust ($\tau_i$) is less than or equal to the threshold value ($\psi$) ($t_i \leq \psi$) among the nodes included in the delegated node set ($N_D$), to the number of delegated nodes (K) according to the delegation rate ($\varphi$).

Meanwhile, the delegation consensus blockchain network 20 according to the present embodiment must have scalability to achieve the required TPS performance even when the number of nodes increases. In addition, when analyzing TPS performance to ensure scalability, delay time that occurs during message exchange between delegated nodes and validation of blocks must be considered together. In addition, decentralization and security, which are naturally required as a trilemma relationship with scalability in the blockchain network 20, must be considered together.

Accordingly, a condition for TPS for scalability should be considered first, and in order to consider the condition for TPS, the latency calculation module 320 calculates latency ($T_{latency}$), which represents the time from when a transaction is applied to the blockchain network 20 until it becomes an irreversible state through a consensus process.

Assuming that a block producer in the blockchain network 20 creates a B byte block including a block header of H byte, the maximum TPS can be calculated as in Equation 6.

$$\mathcal{T}(B, T_I) = \frac{\lfloor (B-H)/b \rfloor}{T_I} \qquad \text{[Equation 6]}$$

Here, $T_I$ represents a block generation interval, and b represents an average transaction size.

The latency ($T_{latency}$) is the time it takes for a transaction to be applied to the blockchain network and connected to the blockchain, and is the sum of the block generation interval ($T_I$) and a consensus time ($T_{consensus}$). Since the consensus time ($T_{consensus}$) can be expressed as the sum of a validation time ($T_v$) and a message transmission time ($T_p$), the latency calculation module 320 can calculate the latency ($T_{latency}$) using Equation 7.

$$T_{latency} = T_I + T_{consensus} \qquad \text{[Equation 7]}$$
$$= T_I + T_v + T_p$$

In the TP-PBFT delegation consensus process described above, one of the K delegated nodes is a block producer and the remaining K−1 delegated nodes act as validators, so in Equation 7, the validation time ($T_v$) can be calculated by dividing it into the block producer and validators.

Since the block producer generates blocks of size M and propagates them to the validators, during the consensus process, the block producer must perform a total of M signature verification and 2M+4(K−1) message authentication code (MAC) generation or verification tasks. And the validators must perform M signature verification and M+4(K−1) message authentication code (MAC) verification tasks.

Therefore, the validation time ($T_{v\_bp}$, $T_{v\_val}$) of each of the block producer and validators can be calculated using Equations 8 and 9.

$$T_{v\_bp} = \frac{M\theta + [2M + 4(K-1)]\alpha}{c_{bp}} \qquad \text{[Equation 8]}$$

$$T_{v\_val} = \frac{M\theta + [M + 4(K-1)]\alpha}{c_i} \qquad \text{[Equation 9]}$$

Here, $\theta$ represents a CPU cycle required for signature verification, $\alpha$ represents a CPU cycle required for generating or verifying the message authentication code, and $c_{bp}$ and $c_i$ are computational resources of the block producer and i-th validator, respectively, and indicate computational speed.

In addition, since the block producer and validators can independently perform validation, the validation time ($T_v$) can be calculated as shown in Equation 10 as the maximum value among validation times ($T_{v\_bp}$, $T_{v\_val}$) of each of the block producer and validators.

$$T_v = \frac{1}{M} \max_{i \in N_D} (T_{v\_bp}, T_{v\_val}) \qquad \text{[Equation 10]}$$

Meanwhile, the message transmission time ($T_p$) represents the sum ($T_p = T_{Pre-prepare} + T_{Prepare} + T_{Commit} + T_{Reply}$) of times ($T_{Pre-prepare}$, $T_{Prepare}$, $T_{Commit}$, $T_{Reply}$) required for a message to reach according to each step (Pre-prepare, Prepare, Commit, Reply) of the consensus process shown in FIG. 2. At this time, in order to prevent excessive delay of the consensus process by a node that does not respond in each step, that is, a node that does not transmit a message, a time limit ($\zeta$) for each step may be set.

Accordingly, the message transmission time ($T_p$) may be calculated according to Equation 11.

$$T_p = \frac{1}{M}(T_{Pre-prepare} + T_{Prepare} + T_{commit} + T_{reply})$$
$$= \frac{1}{M}\left(\min\left(\max_{i \in N_D, i \neq bp} \frac{MB}{R_{bp,i}}, \zeta\right)\right.$$
$$+ \min\left(\max_{i,j \in N_D, i \neq bp, j \neq i} \frac{MB}{R_{i,j}}, \zeta\right)$$
$$+ \min\left(\max_{i,j \in N_D, j \neq i} \frac{MB}{R_{i,j}}, \zeta\right)$$
$$\left.+ \min\left(\max_{i \in N_D} \frac{MB}{R_{i,client}}, \zeta\right)\right)$$
[Equation 11]

Here, the subscript bp represents a block producer, and the client represents a non-delegated node. And $R_{i,j}$ is the data transmission rate in the message exchange process between the i delegated node and the j delegated node, and can be expressed by quantization (R={$R_1, R_2, \ldots, R_r$}) with r levels, it is assumed that a finite-state Markov channel model is applied, and the state transition probability matrix ($[p_R(t)]_{r \times r}$) can be calculated as $p_R(t) = \Pr[R_{i,j}(t+1) = R_b | R_{i,j}(t) = R_a]$. Pr[] is a conditional probability function, and $R_a$, $R_b \in R$.

However, since the transaction consensus process must be completed within u consecutive block intervals ($uT_I$) according to the characteristics of the blockchain, the latency ($T_{latency}$) calculated by Equation 7 in the latency calculation module 320 must satisfy Equation 12.

$$T_{latency} = T_f + T_v + T_p \leq uT_I$$
[Equation 12]

Meanwhile, in the safety analysis module 330, as known in the PBFT-based consensus algorithm in terms of security, when there are f malicious nodes among N nodes participating in consensus, if the safety condition of (3f+1)≤N is satisfied, the consensus can be performed normally.

However, in the delegation consensus blockchain network of the present embodiment, since K nodes among N nodes participate in the consensus process as delegated nodes, the delegation rate ($\varphi$) must be determined at a level that satisfies the safety condition of PBFT.

Looking at the delegation rate ($\varphi$) to ensure safety, if the probability that each node is a malicious node is p, the worst case can be considered when all malicious nodes are selected as delegated nodes. In order to satisfy the safety condition even in this worst case, the number of delegated nodes (K=$\lfloor \varphi N \rfloor$) selected according to the delegation rate ($\varphi$) must exceed 3 times the number of malicious nodes (Np) according to the probability (p) in all nodes (N). And since the maximum value of the delegation rate is 1, the range of the delegation rate ($\varphi$) must be set to satisfy Equation 13.

$$3Np + 1 \leq \lfloor \varphi N \rfloor \leq N$$
[Equation 13]

However, as described above, the range of the delegation rate ($\varphi$) according to Equation 13 is a result calculated by assuming the worst case in which all malicious nodes are included in the delegated node set ($N_D$). However, in the trust-based delegation consensus blockchain network 20 of the present embodiment, since delegated nodes are selected based on the trust of each of a plurality of nodes, there is a high possibility that a malicious node is not included in the delegated node set ($N_D$).

Therefore, it is necessary to modify Equation 13 in consideration of the probability ($p_d$) that a delegated node included in the delegated node set ($N_D$), not all nodes, is a malicious node. Accordingly, the number of malicious nodes included in the node set ($N_D$) can be calculated by weighting the number of delegated nodes (K=$\lfloor \varphi N \rfloor$) with the probability of being a malicious node ($p_d$), and accordingly, in the trust-based delegation consensus blockchain network 20, the range of the delegation rate ($\varphi$) according to the safety condition must be determined to satisfy Equation 14.

$$3\lfloor \varphi N \rfloor p_d + 1 \leq \lfloor \varphi N \rfloor \leq N$$
[Equation 14]

If the condition for TPS for scalability and the condition for delegation rate ($\varphi$) for security are confirmed among the trilemma of blockchain networks, it is necessary to confirm the condition for decentralization.

Various methods of measuring the decentralization of the blockchain network 20 have already been proposed, but here, unlike the existing ones, the Gini coefficient used as an index for evaluating the level of inequality in various fields is used. In the trust-based delegation consensus blockchain network, since delegated nodes can be selected based on the trust of the nodes, it is highly likely that a specific node will be repeatedly selected as a delegated node, which becomes an element that hinders decentralization.

Accordingly, in the present embodiment, the Gini coefficient calculation module 340 calculates the Gini coefficient ($G(\delta)$) representing the degree of imbalance in the number of times selected as delegated nodes among N nodes, that is, inequality. That is, the Gini coefficient ($G(\delta)$) representing the deviation of the ratio of the number of times ($\delta$) in which each node participates in the delegation consensus compared to other nodes is calculated according to Equation 15.

$$G(\delta) = \frac{\sum_{i=1}^{N} \sum_{j=1}^{N} |\delta_i - \delta_j|}{2 \sum_{i=1}^{N} \sum_{j=1}^{N} \delta_i}$$
$$= \frac{\sum_{i=1}^{N} \sum_{j=1}^{N} |\delta_i - \delta_j|}{2N \sum_{i=1}^{N} \delta_i}$$
[Equation 15]

The Gini coefficient ($G(\delta)$) has a value between 0 and 1, and the closer to 1, the more unequal it is, so that the number of times ($\delta_i$) that a particular node (i) participates in delegation consensus is greater than that of other nodes, indicating that decentralization is hindered. Therefore, if the decentralization threshold ($\eta$) is set so that the Gini coefficient ($G(\delta)$) does not exceed the decentralization threshold ($\eta$) as in Equation 16, the constraints on decentralization can be satisfied.

$$G(\delta) \leq \eta$$
[Equation 16]

At this time, as a way to limit the Gini coefficient ($G(\delta)$) from exceeding the decentralization threshold ($\eta$), there are a method of restricting a specific node (i) from being repeatedly selected and a method of increasing the delegation rate ($\varphi$) so that more nodes participate in the delegation consensus.

Here, as an example, it is assumed that a method of increasing the delegation rate (φ) for decentralization so that more nodes participate in the delegation consensus is used, but is not limited thereto.

The reward calculation module 350 calculates the reward ($R^t$) corresponding to the next state information ($S^{t+1}$) obtained based on the action ($A^t$) determined by the agent module 220. At this time, the reward calculation module 350 may provide the reward ($R^t$) depending on whether the determined action ($A^t$) satisfies the latency ($T_{latency}$) condition of Equation 12 for scalability, the safety condition of Equation 14 for security, and the Gini coefficient ($G(\delta)$) condition of Equation 16 for decentralization, which are the trilemma of the blockchain network. Here, the reward ($R^t$) may be calculated as the maximum TPS according to Equation 6.

Referring back to FIG. 4, the memory module 210 may store a plurality of state information ($S^t=[R, c, \delta, \tau, \widehat{p_d}]^t$) including data transmission rate ($R=\{R_{i,j}\}$) between delegated nodes at each epoch (t) and computational resources ($\delta=\{\delta_i\}$) of each delegated node, the number of times ($\delta=\{\delta_i\}$) delegated nodes participated in delegation consensus, the trust ($\tau=\{\tau_i\}$) of each delegated node and the probability of a malicious delegated node ($\widehat{p_d}$), as an environment of the trust-based delegation consensus blockchain network 20.

In addition, the memory module 210 may match and store an action ($A^t=[B, T_I, \varphi]^t$) together, including a block size ($B \in \{1, 2, \ldots, \dot{B}\}$), a block interval ($T_I \in \{0.5, 1, \ldots, \dot{T}_I\}$) and a delegation rate ($\varphi \in \{0.1, 0.2, \ldots, 1\}$) determined by the agent module 220 in response to each of a plurality of state information ($S^t$).

In addition, in the memory module 210, state information ($S^t$) at a specific epoch (t), state information ($S^{t+1}=[R, c, \delta, \tau, \widehat{p_d}]^{t+1}$) at the next epoch (t+1) determined by the environment analysis module 230 by the action ($A^t$) determined in response thereto, and a reward ($R^t$) corresponding to the next state information ($S^{t+1}$) can be stored together.

That is, the memory module 210 may match and store the state information ($S^t$) of the blockchain network 20, the corresponding action ($A^t$), the next state information ($S^{t+1}$) according to the action ($A^t$) and the reward ($R^t$) together at each epoch interval. Here, the state information ($S^t$), the action ($A^t$), the next state information ($S^{t+1}$) and the reward ($R^t$) that are matched and stored together in the memory module 210 are referred to as a transition set.

The agent module 220 is implemented with an artificial neural network trained by a reinforcement learning method and determines an action ($A^t$) corresponding to the state information ($S^t$) at a specific epoch (t) applied from the memory module 210. The agent module 220 performs a neural network operation according to the trained method for the data transmission rate (R) between nodes, computational resources (c) of each node, the number of times (δ) participated in delegation consensus, the trust (τ) of node and the probability of a malicious delegated node ($\widehat{p_d}$) included in the state information ($S^t$), to estimate and output the optimal block size (B), block interval ($T_I$) and delegation rate (φ).

The agent module 220 may estimate and output at least one action (A) including a block size (B), a block interval ($T_I$) and a delegation rate (φ), respectively.

In addition, the agent module 220 may select, among the estimated at least one action (A), one action ($A^t$) that satisfies the latency condition ($T_{latency}$) of Equation 12 for scalability, the safety condition of Equation 14 for security and the Gini coefficient ($G(\delta)$) condition of Equation 16 for decentralization, which are trilemma of a blockchain network, as shown in Equation 17.

$$\text{Objective}: \max_A Q(S, A) \quad \text{[Equation 17]}$$

$$\text{Constraint 1}: T_{latency} = T_I + T_v + T_p \leq uT_I$$

$$\text{Constraint 2}: 3\lfloor \varphi N \rfloor \hat{p}_d + 1 \leq \lfloor \varphi N \rfloor \leq N$$

$$\text{Constraint 3}: G(\delta) \leq \eta$$

Here, Q(S,A) is an action-value function representing an action performed by the agent module 220, is a function that outputs a value of each of a plurality of actions (A) that can be determined in the agent module 220 in response to the state information (S), and is calculated by Equation 18.

$$Q(S, A) = V(S) + \left(\mathcal{A}(S, A) - \frac{1}{|A|}\sum_{a'} A(S, a')\right) \quad \text{[Equation 18]}$$

Here, V(S) and A(S,A) are a value function and an advantage function according to rainbow DQN, respectively, and a' represents a selectable action candidate.

The agent module 220 also selects K ($K=\lfloor \varphi N \rfloor$) nodes corresponding to the delegation rate (φ) determined by the action with different probabilities based on the trust (τ) of each node and sets them as delegated nodes.

Accordingly, when all the constraints of Equation 17 are satisfied, the reward calculation module 350 of the environment analysis module 230 may calculate the maximum TPS as the reward ($R^t$) according to Equation 6 as shown in Equation 19.

$$\mathcal{R}^t = \mathcal{R}(S^t, A^t) = \frac{\lfloor (B-H)/b \rfloor}{T_I} \quad \text{[Equation 19]}$$

That is, the apparatus for managing a network of the present embodiment can maximize the TPS of the blockchain network 20 to improve the scalability of the blockchain network 20 while maintaining security and decentralization.

In the illustrated embodiment, respective configurations may have different functions and capabilities in addition to those described below, and may include additional configurations in addition to those described below. In addition, in an embodiment, each configuration may be implemented using one or more physically separated devices, or may be implemented by one or more processors or a combination of one or more processors and software, and may not be clearly distinguished in specific operations unlike the illustrated example.

In addition, the nodes of the blockchain network and the apparatus for managing a network shown in FIGS. 3 to 5 may be implemented in a logic circuit by hardware, firmware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

In addition, the nodes of the blockchain network and the apparatus for managing a network may be mounted in a computing device or server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

Figure 7:
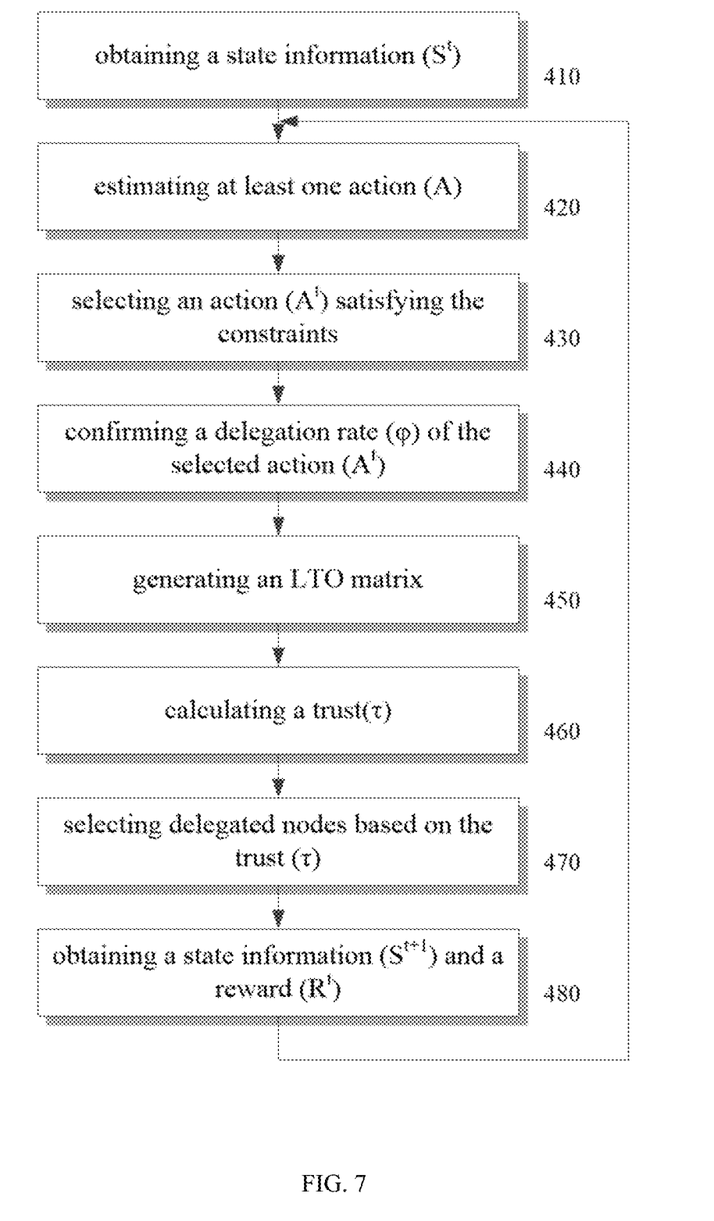
FIG. 7 shows a method for managing delegation consensus of a blockchain network according to an embodiment.

FIG. 7 shows a method for managing delegation consensus of a blockchain network according to an embodiment.

Referring to FIG. 1 to FIG. 6, the method for managing delegation consensus of a blockchain network according to an embodiment is described as follows. First, state information ($S^t$) at the current epoch (t) is obtained (410). Here, the state information (St) may include data transmission rate (R) between delegated nodes, computational resources (c) of each delegated node, the number of times ($\delta$) delegated nodes participated in delegation consensus, the trust ($\tau$) of each delegated node and the probability of a malicious delegated node ($\widehat{P_d}$).

When the state information ($S^t$) is obtained, at least one action (A) corresponding to the state information ($S^t$) is estimated by performing a neural network operation on the obtained state information ($S^t$) with an artificial neural network trained by a reinforcement learning method (420). Here, each of the estimated at least one action (A) may include a block size (B), a block interval ($T_I$), and a delegation rate ($\varphi$).

Then, when at least one action (A) with different block size (B), block interval ($T_I$) and delegation rate ($\varphi$) is estimated, one action that satisfies the specified constraint is selected among the estimated at least one action (A), and determined as the action ($A^t$) for the current epoch (430). At this time, among the estimated at least one action (A), one action ($A^t$) may be selected that satisfies all of the latency condition ($T_{latency}$) of Equation 12 for scalability, the safety condition of Equation 14 for security and the Gini coefficient ($G(\delta)$) condition of Equation 16 for decentralization, which are trilemma of a blockchain network.

Accordingly, the block size (B), block interval ($T_I$) and delegation rate ($\varphi$) included in the action ($A^t$) are determined based on the data transmission rate (R) between delegated nodes, computational resources (c) of each delegated node, the number of times ($\delta$) delegated nodes participated in delegation consensus, the trust ($\tau$) of each delegated node and the probability of a malicious delegated node ($\widehat{P_d}$) included in the state information ($S^t$). Then, the determined action ($A^t$) may be matched with the state information ($S^t$) and stored in the memory module 210.

When the action ($A^t$) is selected and the delegation rate ($\varphi$) is determined, DCR records derived from a plurality of delegated nodes are collected, and based on the collected DCR records, an LTO matrix representing mutual subjective evaluations of the plurality of delegated nodes is generated according to Equation 1 (450).

At this time, each row of the generated LTO matrix represents a delegated node that generated a DCR record as a delegated node performing subjective evaluation on delegated nodes, and each column represents a delegated node that transmitted a commit message included in the DCR record as a delegated node being evaluated.

When the LTO matrix is generated, the trust for each of the plurality of delegated nodes is calculated based on the generated LTO matrix (460). The trust for each delegated node is calculated from the LTO matrix, the trust ($\tau$) for each delegated node is calculated according to Equation 4 from the average subjective trust value ($\mu$) and the trust similarity (v), and the average subjective trust value ($\mu$) and the trust similarity (v) can be calculated according to Equations 2 and 3, respectively.

When the trust ($\tau$) for each delegated node is calculated, K ($K=\lfloor \varphi N \rfloor$) delegated nodes participating in the consensus according to the determined delegation ratio ($\varphi$) among the N nodes are selected with different probabilities based on the trust ($\tau$) (470).

When the action ($A^t$) according to the state information ($S^t$) in the current epoch (t) is determined, and delegated nodes are selected with different probabilities according to the trust ($\tau$) of each of a plurality of nodes, state information ($S^{t+1}$) for the next epoch (t+1) is confirmed by analyzing the data transmission rate (R) between the selected delegated nodes, computational resources (c) of each delegated node, the number of times ($\delta$) delegated nodes participated in delegation consensus, the trust ($\tau$) of each delegated node and the probability of a malicious delegated node ($\widehat{P_d}$), and a reward ($R^t$) is calculated and obtained (480). The method for managing a network of the embodiment aims to maintain security and decentralization while improving the scalability of the blockchain network 20 by maximizing the TPS of the blockchain network 20, so here the reward ($R^t$) can be calculated as the maximum TPS.

In FIG. 7, it is described that respective processes are sequentially executed, which is, however, illustrative, and those skilled in the art may apply various modifications and changes by changing the order illustrated in FIG. 7 or performing one or more processes in parallel or adding another process without departing from the essential gist of the exemplary embodiment of the present disclosure.

Figure 8:
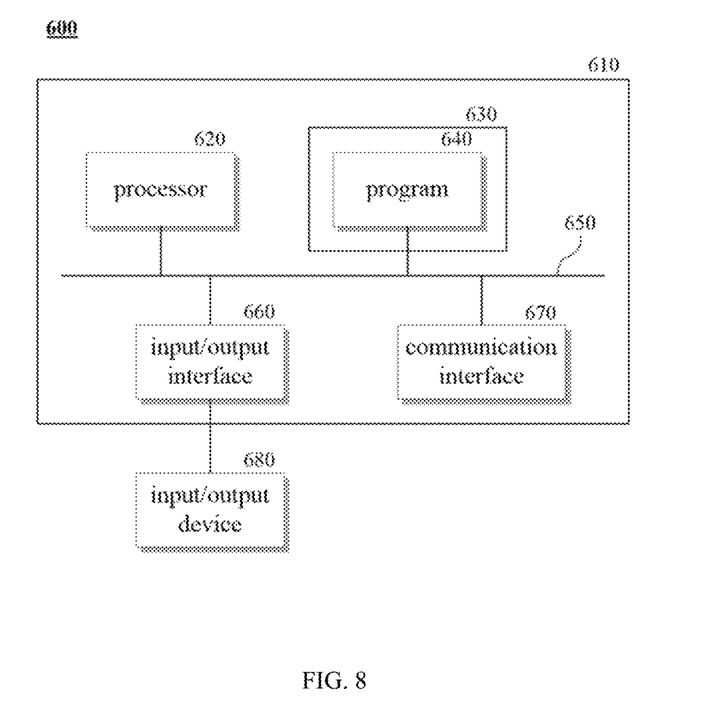
FIG. 8 is a diagram for explaining a computing environment including a computing device according to an embodiment.

FIG. 8 is a diagram for explaining a computing environment including a computing device according to an embodiment.

In the illustrated embodiment, respective configurations may have different functions and capabilities in addition to those described below, and may include additional configurations in addition to those described below. The illustrated computing environment 600 may include a computing device 610 to perform the method for managing a network illustrated in FIG. 7. In an embodiment, the computing device 610 may be one or more components included in the node of the blockchain network and the apparatus for managing a network shown in FIGS. 3 to 5.

The computing device 610 includes at least one processor 620, a computer readable storage medium 630 and a communication bus 650. The processor 620 may cause the computing device 610 to operate according to the above-mentioned exemplary embodiment. For example, the processor 620 may execute one or more programs 640 stored in the computer readable storage medium 630. The one or more programs 640 may include one or more computer executable instructions, and the computer executable instructions may be configured, when executed by the processor 620, to cause the computing device 610 to perform operations in accordance with the exemplary embodiment. And the storage medium 630 may be composed of a memory.

The communication bus 650 interconnects various other components of the computing device 610, including the processor 620 and the computer readable storage medium 630.

The computing device 610 may also include one or more input/output interfaces 660 and one or more communication interfaces 670 that provide interfaces for one or more input/output devices 680. The input/output interfaces 660 and the communication interfaces 670 are connected to the communication bus 650. The input/output devices 680 may be connected to other components of the computing device 610 through the input/output interface 660. Exemplary input/output devices 680 may include input devices such as a pointing device (such as a mouse or trackpad), keyboard, touch input device (such as a touchpad or touchscreen), voice or sound input device, sensor devices of various types and/or photography devices, and/or output devices such as a display device, printer, speaker and/or network card. The exemplary input/output device 680 is one component constituting the computing device 610, may be included inside the computing device 610, or may be connected to the computing device 610 as a separate device distinct from the computing device 610.

The present invention has been described in detail through a representative embodiment, but those of ordinary skill in the art to which the art pertains will appreciate that various modifications and other equivalent embodiments are possible. Therefore, the true technical protection scope of the present invention should be defined by the claims.

What is claimed is:

1. An apparatus for managing delegation consensus of a blockchain network, the apparatus having: one or more processors; and a memory storing one or more programs executed by the one or more processors,
    wherein the processors
    obtain state information including trust of each delegated node in a current epoch of the blockchain network,
    determine an action including a delegation rate by performing a neural network operation on the state information,
    create, according to the determined action, a local trust opinion (LTO) matrix representing a mutual subjective evaluation of each delegated node, and
    select, based on the trust calculated using the LTO matrix, K delegated nodes according to the determined delegation rate among N nodes,
    wherein the processors calculate the trust of each delegated node by calculating an average subjective trust value and trust similarity for each delegated node based on the LTO matrix.

2. The apparatus for managing delegation consensus of a blockchain network according to claim 1,
    wherein the processors create the LTO matrix by collecting Delegated Consensus Result (DCR) records in which each delegated node selected in the current epoch collects commit messages for consent or non-consent propagated from other nodes besides the delegated node selected in the current epoch during Practical Byzantine Fault Tolerance (PBFT) consensus process.

3. The apparatus for managing delegation consensus of a blockchain network according to claim 1,
    wherein the processors collect the DCR records obtained by each of the delegated nodes collecting intention messages transmitted with consent ("Yea") or non-consent ("Nay") collected from a plurality of delegated nodes, and calculates elements ($L_{i,j}$) of the LTO matrix from the collected DCR records according to Equation $$L_{i,j} = \begin{cases} \dfrac{\sum_i (\text{Yea})}{\sum_i (\text{Yea}) + \sum_i (\text{Nay})}, & \text{if commit of } j \text{ is 'Yea'} \\ \dfrac{\sum_i (\text{Nay})}{\sum_i (\text{Yea}) + \sum_i (\text{Nay})}, & \text{if commit of } j \text{ is 'Nay'} \end{cases}$$

(wherein, i and j are delegated node identifiers, respectively (i, j $\in$ [1, 2, ..., K]), and $\Sigma_i$(Yea) and $\Sigma_i$(Nay) are the number of consent ("Yea") and non-consent ("Nay") in the DCR of delegated node (i), respectively) to create the LTO matrix.

4. The apparatus for managing delegation consensus of a blockchain network according to claim 1,
    wherein the processors
    calculate the average subjective trust value ($\mu_i$) for each of the delegated nodes (i) according to Equation $$\mu_i = \frac{1}{K}\sum_{j=1}^{K} L_{j,i}$$

(wherein, $L_{j,i}$ represents (j, i) element of the LTO matrix), calculate the trust similarity ($v_i$) for the delegated nodes (i) according to Equation $$v_i = \frac{1}{K}\sum_{j=1}^{K} \frac{L_i \cdot L_j}{\|L_i\|\|L_j\|}$$

(wherein, $\|\cdot\|$ is an absolute value function, and $L_i$ and $L_j$ represent i-th and j-th row vectors of the LTO matrix, respectively), and
    calculate the trust ($\tau_i$) of each delegated node according to Equation $$\tau_i = \mu_i v_i.$$

5. The apparatus for managing delegation consensus of a blockchain network according to claim 1,
    wherein the processors further obtain, in addition to the trust of each delegated node, a data transmission rate between delegated nodes and computational resources of each delegated node, the number of times delegated nodes participated in delegation consensus, and malicious delegated node probability representing a probability that a malicious node whose calculated trust is less than or equal to a predetermined trust threshold is selected as a delegated node, as the state information.

6. The apparatus for managing delegation consensus of a blockchain network according to claim 5,
    wherein the processors obtain the malicious delegated node probability ($\widehat{p_d}$) by calculating it according to Equation $$\widehat{p_d} = \frac{n(i \mid i \in \mathcal{N}_D, \tau_i \le \psi)}{K}$$

(wherein, $\mathcal{N}_D$ is a set of delegation nodes ($\mathcal{N}_D \subset \mathcal{N}$), $\tau_i$ is a trust of a delegated node, and $n(\cdot)$ is a count function that counts the number satisfying a condition of ($\cdot$)).

7. The apparatus for managing delegation consensus of a blockchain network according to claim 6, wherein the processors calculate a latency representing a time from when a transaction is applied to the blockchain network to an irreversible state through a consensus process, determine a latency condition according to u consecutive block intervals, determine a safety condition indicating a range of delegation rate that makes a ratio of malicious nodes among delegated nodes participating in the delegation consensus according to a Practical Byzantine Fault Tolerance (PBFT) condition less than a predetermined ratio, calculate a Gini coefficient representing a degree of imbalance in the number of times selected as a delegated node among N nodes, determine a Gini coefficient condition that ensures that the Gini coefficient does not exceed a predetermined decentralization threshold, and, when the determined action satisfies the latency condition, the safety condition and the Gini coefficient condition, calculate a reward.

8. The apparatus for managing delegation consensus of a blockchain network according to claim 7, wherein the processors calculate the latency ($T_{latency}$) as sum of a block generation interval ($T_I$), which represents an interval at which block producer, among a plurality of delegated nodes, generates blocks, a validation time ($T_v$) in which a plurality of delegated nodes validate the generated blocks, and a message transmission time ($T_p$) in which validation result message is transmitted, set the latency condition such that the calculated latency ($T_{latency}$) is equal to or less than a consecutive block interval ($uT_I$), set the safety condition according to Equation $$3\lfloor \varphi N \rfloor p_d + 1 \leq \lfloor \varphi N \rfloor \leq N$$

such that, based on the probability ($p_d$) that a delegated node selected according to the delegation rate ($\varphi$) is a malicious node, the number of delegated nodes ($K = \lfloor \varphi N \rfloor$) exceeds three times the number of malicious nodes ($\lfloor \varphi N \rfloor p_d$) within the delegated nodes, and based on the number of times ($\delta$) that each of the N nodes is selected as a delegated node and participates in delegation consensus, set the Gini coefficient condition $G(\delta) \leq \eta$, such that the Gini coefficient calculated by Equation $$G(\delta) = \frac{\sum_{i=1}^{N} \sum_{j=1}^{N} |\delta_i - \delta_j|}{2 \sum_{i=1}^{N} \sum_{j=1}^{N} \delta_i}$$

$$= \frac{\sum_{i=1}^{N} \sum_{j=1}^{N} |\delta_i - \delta_j|}{2N \sum_{i=1}^{N} \delta_i}$$

is equal to or less than a decentralization threshold ($\eta$).

9. The apparatus for managing delegation consensus of a blockchain network according to claim 7, wherein the processors determine the action ($A^t$) by determining a block size (B), a block interval ($T_I$) and a delegation rate ($\varphi$) maximizing TPS (Transaction Per Second) while satisfying the latency condition, the safety condition, and the Gini coefficient condition.

10. The apparatus for managing delegation consensus of a blockchain network according to claim 9, wherein the processors calculate the maximum TPS of the delegation consensus of the blockchain network as the reward ($R^t$) according to Equation $$R^t = \mathcal{R}(S^t, A^t) = \frac{\lfloor (B-H)/b \rfloor}{T_I}$$

(wherein, $T_I$ is a block generation interval, B is a block size, H is a block header size, and b is an average transaction size).

11. A method for managing delegation consensus of a blockchain network, the method performed by a computing device having one or more processors and a memory storing one or more programs executed by the one or more processors, wherein the method comprises the steps of:

obtaining state information including trust of each delegated node in a current epoch of the blockchain network;

determining an action including a delegation rate by performing a neural network operation on the state information;

creating, according to the determined action, a local trust opinion (LTO) matrix representing a mutual subjective evaluation of each delegated node; and selecting, based on the trust calculated using the LTO matrix, K delegated nodes according to the determined delegation rate among N nodes, wherein the step of selecting K delegated nodes comprises calculating the trust of each delegated node by calculating an average subjective trust value and trust similarity for each delegated node based on the LTO matrix.

12. The method for managing delegation consensus of a blockchain network according to claim 11, wherein the step of creating an LTO matrix comprises creating the LTO matrix by collecting Delegated Consensus Result (DCR) records in which each delegated node selected in the current epoch collects commit messages for consent or non-consent propagated from other nodes besides the delegated node selected in the current epoch during Practical Byzantine Fault Tolerance (PBFT) consensus process.

13. The method for managing delegation consensus of a blockchain network according to claim 11, wherein the step of creating an LTO matrix comprises collecting the DCR records obtained by each of the delegated nodes collecting intention messages transmitted with consent ("Yea") or non-consent ("Nay") collected from a plurality of delegated nodes, and calculating elements ($L_{i,j}$) of the LTO matrix from the collected DCR records according to Equation $$L_{i,j} = \begin{cases} \dfrac{\sum_k (\text{Yea})}{\sum_k (\text{Yea}) + \sum_k (\text{Nay})}, & \text{if commit of } j \text{ is 'Yea'} \\ \dfrac{\sum_k (\text{Nay})}{\sum_k (\text{Yea}) + \sum_k (\text{Nay})}, & \text{if commit of } j \text{ is 'Nay'} \end{cases}$$

(wherein, i and j are delegated node identifiers, respectively (i, j ∈ [1, 2, . . . , K]), and $\Sigma_i(\text{Yea})$ and $\Sigma_i(\text{Nay})$ are the number of consent ("Yea") and non-consent ("Nay") in the DCR of delegated node (i), respectively) to create the LTO matrix.

14. The method for managing delegation consensus of a blockchain network according to claim 11,
wherein the step of selecting K delegated nodes comprises calculating the average subjective trust value ($\mu_i$) for each of the delegated nodes (i) according to Equation $$\mu_i = \frac{1}{K}\sum_{j=1}^{K} L_{j,i}$$

(wherein, $L_{j,i}$ represents (j, i) element of the LTO matrix), calculating the trust similarity ($v_i$) for the delegated nodes (i) according to Equation $$v_i = \frac{1}{K}\sum_{j=1}^{K} \frac{L_i \cdot L_j}{\|L_i\|\|L_j\|}$$

(wherein, $\|\cdot\|$ is an absolute value function, and $L_i$ and $L_j$ represent i-th and j-th row vectors of the LTO matrix, respectively), and
calculating the trust ($\tau_i$) of each delegated node according to Equation $$\tau_i = \mu_i v_i$$

15. The method for managing delegation consensus of a blockchain network according to claim 11,
wherein the step of obtaining state information comprises further obtaining, in addition to the trust of each delegated node, a data transmission rate between delegated nodes and computational resources of each delegated node, the number of times delegated nodes participated in delegation consensus, and malicious delegated node probability representing a probability that a malicious node whose calculated trust is less than or equal to a predetermined trust threshold is selected as a delegated node, as the state information.

16. The method for managing delegation consensus of a blockchain network according to claim 15,
wherein the method for managing delegation consensus of a blockchain network further comprises the step of obtaining next state information and a reward according to the determined action, and
wherein the step of obtaining next state information and a reward comprises calculating the malicious delegated node probability ($\widehat{p_d}$) according to Equation $$\widehat{p_d} = \frac{n(i \mid i \in N_D, \tau_i \leq \psi)}{K}$$

(wherein, $N_D$ is a set of delegation nodes ($N_D \subset N$), $\tau_i$ is a trust of a delegated node, and n(•) is a count function that counts the number satisfying a condition of (•)).

17. The method for managing delegation consensus of a blockchain network according to claim 16,
wherein the step of obtaining next state information and a reward comprises
calculating a latency representing a time from when a transaction is applied to the blockchain network to an irreversible state through a consensus process, determining a latency condition according to u consecutive block intervals,
determining a safety condition indicating a range of delegation rate that makes a ratio of malicious nodes among delegated nodes participating in the delegation consensus according to a Practical Byzantine Fault Tolerance (PBFT) condition less than a predetermined ratio,
calculating a Gini coefficient representing a degree of imbalance in the number of times selected as a delegated node among N nodes, determining a Gini coefficient condition that ensures that the Gini coefficient does not exceed a predetermined decentralization threshold, and,
when the determined action satisfies the latency condition, the safety condition and the Gini coefficient condition, calculating a reward.

18. The method for managing delegation consensus of a blockchain network according to claim 16,
wherein the step of obtaining next state information and a reward comprises
calculating a latency ($T_{latency}$) as sum of a block generation interval ($T_f$), which represents an interval at which block producer, among a plurality of delegated nodes, generates blocks, a validation time ($T_v$) in which a plurality of delegated nodes validate the generated blocks, and a message transmission time ($T_p$) in which validation result message is transmitted, setting a latency condition such that the calculated latency ($T_{latency}$) is equal to or less than a consecutive block interval ($uT_f$),
setting a safety condition according to Equation $$3\lfloor \varphi N \rfloor p_{d+} 1 \leq \lfloor \varphi N \rfloor \leq N$$

such that, based on the probability ($p_d$) that a delegated node selected according to the delegation rate ($\varphi$) is a malicious node, the number of delegated nodes ($K = \lfloor \varphi N \rfloor$) exceeds three times the number of malicious nodes ($\lfloor \varphi N \rfloor p_d$) within the delegated nodes, and
based on the number of times ($\delta$) that each of the N nodes is selected as a delegated node and participates in delegation consensus, setting a Gini coefficient condition as $G(\delta) \leq \eta$, such that a Gini coefficient calculated by Equation $$G(\delta) = \frac{\sum_{i=1}^{N} \sum_{j=1}^{N} |\delta_i - \delta_j|}{2\sum_{i=1}^{N} \sum_{j=1}^{N} \delta_i}$$

$$= \frac{\sum_{i=1}^{N} \sum_{j=1}^{N} |\delta_i - \delta_j|}{2N \sum_{i=1}^{N} \delta_i}$$

is equal to or less than a decentralization threshold ($\eta$).

* * * * *